(12) United States Patent
Chen et al.

(10) Patent No.: US 11,619,789 B2
(45) Date of Patent: Apr. 4, 2023

(54) DUAL CONNECTOR CARRIER WITH SIMULTANEOUS LOCKING MECHANISM

(71) Applicant: Quanta Computer Inc., Taoyuan (TW)

(72) Inventors: Chao-Jung Chen, Taoyuan (TW);
Chih-Hsiang Lee, Taoyuan (TW);
Hou-Hsien Chang, Taoyuan (TW);
Rong-Teng Sie, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 17/454,352

(22) Filed: Nov. 10, 2021

(65) Prior Publication Data

US 2023/0034045 A1 Feb. 2, 2023

Related U.S. Application Data

(60) Provisional application No. 63/203,699, filed on Jul. 28, 2021.

(51) Int. Cl.
*H04B 10/00* (2013.01)
*G02B 6/42* (2006.01)
*H01R 13/502* (2006.01)
*G02B 6/38* (2006.01)

(52) U.S. Cl.
CPC ......... *G02B 6/4292* (2013.01); *G02B 6/3831* (2013.01); *G02B 6/4246* (2013.01); *G02B 6/4284* (2013.01); *H01R 13/502* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,666,242 A | * | 5/1987 | Cairns | G02B 6/4448 439/588 |
| 4,682,848 A | * | 7/1987 | Cairns | G02B 6/3882 385/72 |
| 4,696,540 A | * | 9/1987 | Adams | G02B 6/3878 385/75 |
| 5,125,056 A | * | 6/1992 | Hughes | G02B 6/3823 385/59 |
| 5,224,186 A | * | 6/1993 | Kishimoto | G02B 6/389 385/72 |
| 5,283,848 A | * | 2/1994 | Abendschein | G02B 6/3888 385/71 |
| 5,337,386 A | * | 8/1994 | Noll | G02B 6/3893 385/75 |
| 5,909,526 A | * | 6/1999 | Roth | G02B 6/3885 385/56 |

(Continued)

*Primary Examiner* — Agustin Bello
(74) *Attorney, Agent, or Firm* — Nixon Peabody LLP

(57) ABSTRACT

An optical transceiver for connection between an optical socket and an electrical socket is disclosed. The optical transceiver includes an electrical connector and an optical connector. The optical transceiver has an electronics housing holding the electrical and optical connectors in relative position to each other allowing the simultaneous connection to an electrical socket and an optical socket. The electrical and optical connectors may be moved between an extended position and a retracted position relative to the electronics housing when being engaged or disengaged with respective electrical and optical sockets.

16 Claims, 17 Drawing Sheets

(56) References Cited

U.S. PATENT DOCUMENTS

| | | | | |
|---|---|---|---|---|
| 5,915,058 A * | 6/1999 | Clairardin | G02B 6/3825 | 385/70 |
| 6,019,519 A * | 2/2000 | Grinderslev | G02B 6/3883 | 385/56 |
| 6,079,881 A * | 6/2000 | Roth | G02B 6/3869 | 385/139 |
| 6,152,608 A * | 11/2000 | Ghara | G02B 6/3893 | 385/60 |
| 6,154,597 A * | 11/2000 | Roth | G02B 6/3885 | 385/139 |
| 6,290,527 B1 * | 9/2001 | Takaya | G02B 6/3885 | 439/352 |
| 6,315,461 B1 * | 11/2001 | Cairns | G02B 6/3816 | 385/139 |
| 6,364,536 B1 * | 4/2002 | Chen | H01R 13/6315 | 439/246 |
| 6,409,393 B1 * | 6/2002 | Grois | G02B 6/3821 | 385/78 |
| 6,591,056 B1 * | 7/2003 | Wall | G02B 6/3821 | 385/60 |
| 6,769,814 B2 * | 8/2004 | Kiani | G02B 6/3885 | 385/60 |
| 7,344,316 B2 * | 3/2008 | McKinnon | G02B 6/3816 | 385/59 |
| 7,416,433 B1 * | 8/2008 | Wu | G02B 6/4246 | 439/372 |
| 8,021,057 B2 * | 9/2011 | Tamura | G02B 6/4244 | 385/75 |
| 8,740,473 B2 * | 6/2014 | Katoh | G02B 6/38875 | 385/60 |
| 8,985,864 B2 * | 3/2015 | Ott | G02B 6/3809 | 385/72 |
| 8,986,036 B2 * | 3/2015 | Lindkamp | H01R 13/6335 | 439/352 |
| 9,523,826 B2 * | 12/2016 | Tsai | G02B 6/4292 | |
| 9,575,272 B2 * | 2/2017 | Ott | G02B 6/4471 | |
| 9,658,407 B2 * | 5/2017 | Völker | G02B 6/3821 | |
| 9,664,861 B2 * | 5/2017 | Waldron | G02B 6/4269 | |
| 9,671,580 B1 * | 6/2017 | Nagarajan | G02B 6/428 | |
| 9,720,189 B1 * | 8/2017 | Wang | G02B 6/4261 | |
| 9,798,091 B2 * | 10/2017 | Samal | G02B 6/3866 | |
| 9,929,500 B1 * | 3/2018 | Ista | H01R 13/6271 | |
| 10,398,050 B2 * | 8/2019 | Tracy | H05K 7/2039 | |
| 10,440,799 B2 * | 10/2019 | Zheng | H05K 9/0058 | |
| 10,534,144 B1 * | 1/2020 | Chen | G02B 6/4261 | |
| 10,578,818 B1 * | 3/2020 | Chen | G02B 6/4284 | |
| 10,606,001 B1 * | 3/2020 | Ko | G02B 6/4246 | |
| 10,634,858 B2 * | 4/2020 | Yeh | G02B 6/4292 | |
| 10,809,474 B2 * | 10/2020 | Wang | G02B 6/4261 | |
| 2005/0148223 A1 * | 7/2005 | Shirk | H01R 13/6275 | 439/160 |
| 2007/0025665 A1 * | 2/2007 | Dean | G02B 6/3869 | 385/59 |
| 2008/0164406 A1 * | 7/2008 | Rollinger | G02B 6/4284 | 250/239 |
| 2009/0010600 A1 * | 1/2009 | Kim | G02B 6/4246 | 385/90 |
| 2009/0321301 A1 * | 12/2009 | Song | G02B 6/4201 | 206/701 |
| 2010/0202736 A1 * | 8/2010 | Roth | G02B 6/3823 | 385/59 |
| 2010/0310213 A1 * | 12/2010 | Lewallen | G02B 6/3817 | 385/75 |
| 2011/0081114 A1 * | 4/2011 | Togami | H01R 13/6335 | 385/136 |
| 2012/0027359 A1 * | 2/2012 | Katoh | G02B 6/3897 | 385/78 |
| 2012/0275120 A1 * | 11/2012 | Nguyen | G02B 6/4284 | 361/747 |
| 2013/0183846 A1 * | 7/2013 | Kappla | G02B 6/4246 | 439/350 |
| 2013/0252451 A1 * | 9/2013 | Henry | G02B 6/4246 | 439/350 |
| 2014/0044398 A1 * | 2/2014 | Tao | G02B 6/4284 | 29/446 |
| 2014/0104808 A1 * | 4/2014 | Koutrokois | G02B 6/4277 | 403/326 |
| 2014/0153195 A1 * | 6/2014 | You | G02B 6/4261 | 361/728 |
| 2015/0093083 A1 * | 4/2015 | Tsai | G02B 6/423 | 385/92 |
| 2015/0263453 A1 * | 9/2015 | Wang | G02B 6/3893 | 385/76 |
| 2015/0362682 A1 * | 12/2015 | Waldron | G02B 6/4269 | 385/84 |
| 2015/0362686 A1 * | 12/2015 | Wang | G02B 6/387 | 385/89 |
| 2016/0266339 A1 * | 9/2016 | Zhang | G02B 6/3853 | |
| 2016/0266340 A1 * | 9/2016 | Zhang | G02B 6/4284 | |
| 2017/0133777 A1 * | 5/2017 | Little | H01R 12/721 | |
| 2017/0363828 A1 * | 12/2017 | Zhu | G02B 6/42 | |
| 2018/0116063 A1 * | 4/2018 | Tracy | H05K 7/02 | |
| 2018/0252871 A1 * | 9/2018 | Yeh | G02B 6/387 | |
| 2018/0254581 A1 * | 9/2018 | Yeh | H01R 13/6272 | |
| 2019/0018199 A1 * | 1/2019 | Leigh | G02B 6/36 | |
| 2019/0044299 A1 * | 2/2019 | Kazav | H01R 4/52 | |
| 2019/0103920 A1 * | 4/2019 | Lin | G02B 6/4246 | |
| 2019/0157810 A1 * | 5/2019 | Little | H01R 12/75 | |
| 2019/0235178 A1 * | 8/2019 | Takano | G02B 6/3825 | |
| 2019/0394904 A1 * | 12/2019 | Lee | H05K 1/0209 | |
| 2020/0183093 A1 * | 6/2020 | Chang | G02B 6/3825 | |
| 2020/0183097 A1 * | 6/2020 | Chang | G02B 6/3831 | |
| 2021/0103108 A1 * | 4/2021 | Wall, Jr | G02B 6/4269 | |
| 2021/0141176 A1 * | 5/2021 | Lu | G02B 6/4277 | |
| 2021/0273373 A1 * | 9/2021 | Ramasubramanian | G02B 6/3816 | |
| 2021/0278602 A1 * | 9/2021 | Bookbinder | G02B 6/38875 | |
| 2022/0075126 A1 * | 3/2022 | Chang | G02B 6/3825 | |
| 2022/0140521 A1 * | 5/2022 | Urtz, Jr. | H01R 9/05 | 439/271 |
| 2022/0221656 A1 * | 7/2022 | Rathinasamy | G02B 6/4292 | |
| 2022/0222388 A1 * | 7/2022 | Teeter | E05B 73/0082 | |
| 2022/0357520 A1 * | 11/2022 | Yang | G02B 6/387 | |

\* cited by examiner

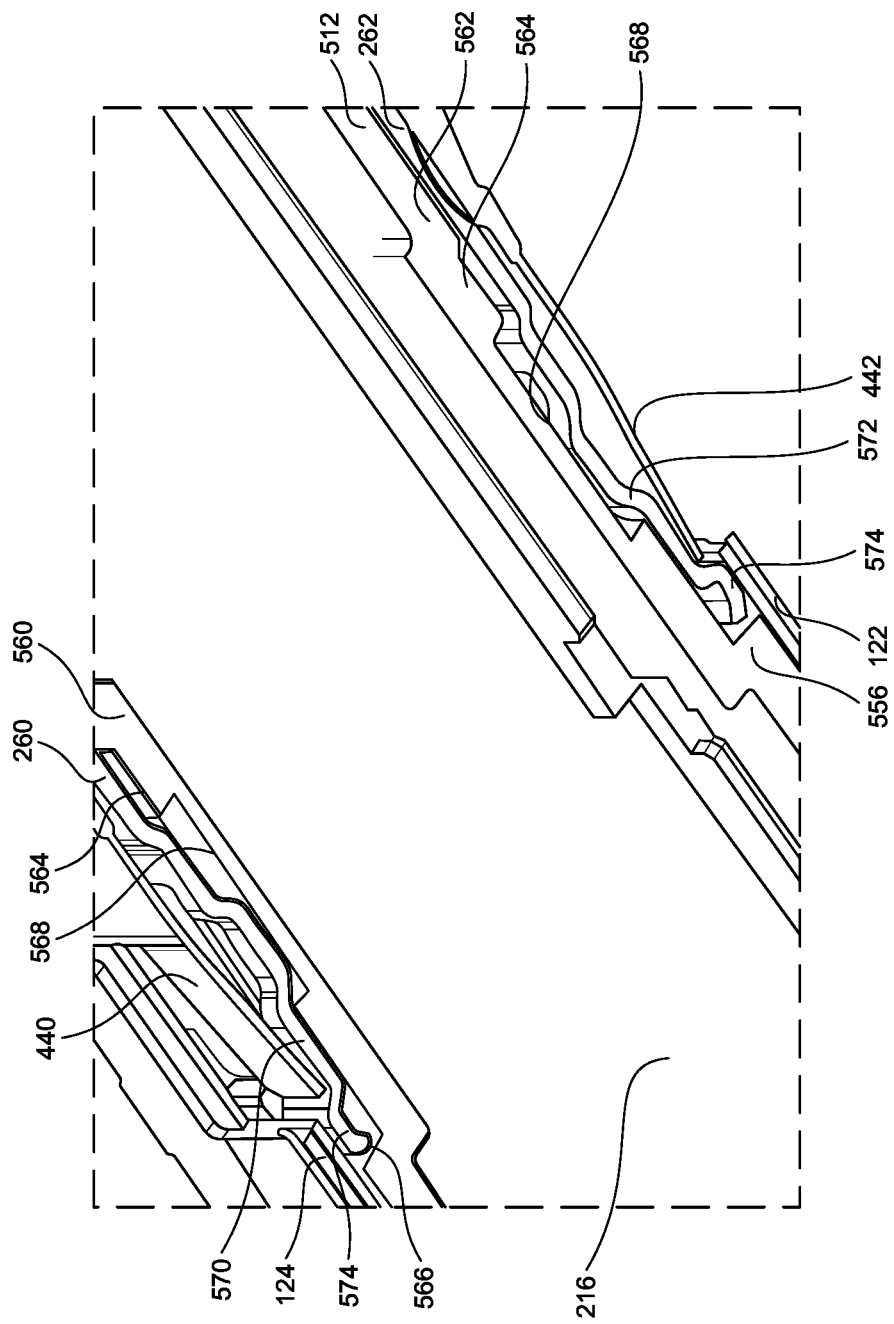

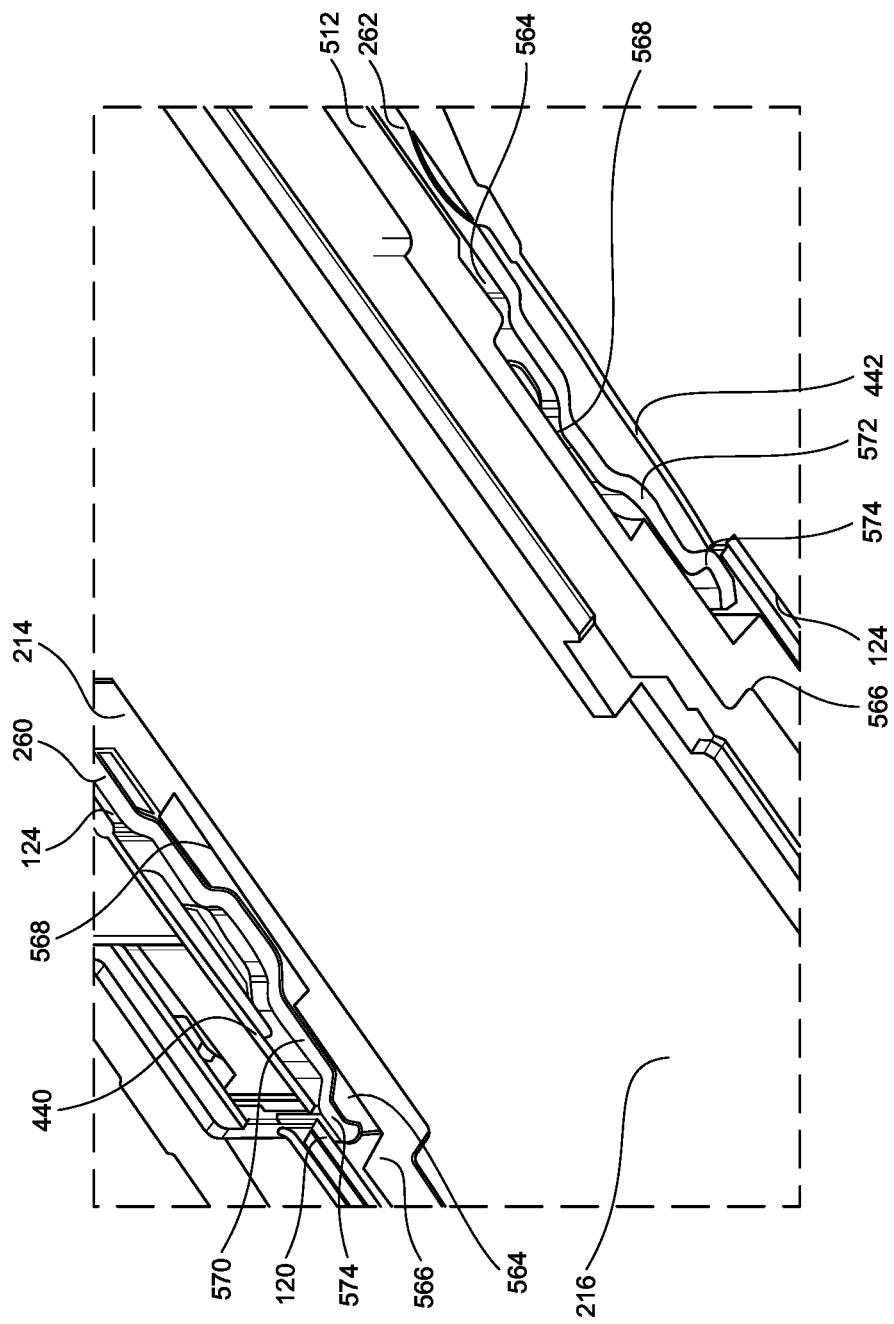

DUAL CONNECTOR CARRIER WITH SIMULTANEOUS LOCKING MECHANISM

CROSS-REFERENCE TO RELATED APPLICATIONS

This application claims priority from and benefit of U.S. Provisional Patent Application Ser. No. 63/203,699, filed on Jul. 28, 2021, titled "Two-in-one unlockable connector carrier," which is hereby incorporated by reference herein in its entirety.

TECHNICAL FIELD

The present disclosure relates generally to optical transceivers, and more specifically, to a dual socket transceiver allowing sequential connection of an optical signal socket to an electrical signal socket.

BACKGROUND

Distributed network systems have been widely adopted with the emergence of the cloud for computing applications. Network systems encompass numerous connected devices including servers, switches, and other components that exchange data. Connections between such devices have generally been wired connections in the past, but with the demand for speed and increased amounts of data, faster optical signal cables have been used. For example, recent transmission speeds in optical systems exceed 10 Gbps and reach 100 Gbps, thus addressing the need for increased data capability and speed.

Optical signals are sent and received through transceivers having circuit components that are necessary to relay optical signals and convert such signals to standard electrical signals. An optical transceiver transmits and receives optical signals through an optical connector mated by optically active devices of a light-emitting device and a light-receiving device, each made of semiconductor materials. An optical transceiver includes electronic components and an optical connector. One type of optical transceiver is a plug-in optical transceiver. Such an optical transceiver is inserted into or removed from a transceiver cage provided on a printed circuit board in an optical switch device. The optical connector of the transceiver engages an optical socket in the optical switch device.

Optical transceivers convert optical signals to electrical signals and are often used to integrate optical switches into components that are connected via traditional copper wire based networks. Currently, optical fiber network switches will have a series of optical signal sockets, such as Multi-fiber Pull Off (MPO) sockets, that may transmit or receive optical data to and from optical networks. Such switches will also have a series of sockets for transmitting and receiving lower bandwidth electrical signals such as Quad Small Form-factor Pluggable (QSFP) sockets. Communication of data between the optical and electrical sockets require an electrical-to-optical transceiver interface that may connect the optical socket to an electrical socket in the optical switch. Since such types of transceivers are easily damaged, they need to be capable of being plugged in and out of the corresponding sockets for easy replacement if damaged. Currently, a separate optical transceiver must be used in conjunction with a separate connector cable for connection to the corresponding electrical sockets.

The order of connection is also important as the optical connection to the optical transceiver should be made before the connection to the electrical socket. The provision of separate cables for connecting a known optical transceiver may therefore result in an error in the order of connection if the cable is connected to the electrical socket before the transceiver is plugged into the optical socket.

Thus, there is a need for an optical transceiver that allows connection between optical signal sockets and electrical signal sockets. There is also a need for an optical transceiver that allows locking and unlocking to allowing connection of both types of connectors in sequence. There is also a need for an optical transceiver that may be easily deployed to connect optical and electrical socket.

SUMMARY

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, an optical transceiver is disclosed. The optical transceiver includes an electrical connector and an optical connector. The optical transceiver has an electronics housing holding the electrical and optical connectors in relative position to each other. The electronics housing allows the simultaneous connection to a respective electrical socket and an optical socket. The electrical and optical connectors may be moved between an extended position and a retracted position relative to the electronics housing when being engaged or disengaged with respective electrical and optical sockets.

A further implementation of the example bracket is where the electrical connector is a Quad Small Form-factor Pluggable (QSFP) connector. Another implementation is where the optical connector is a Multi-fiber Pull Off (MPO) connector. Another implementation is where the optical transceiver includes a handle coupled to the electrical and optical connectors. Another implementation is where the optical transceiver includes an outer casing connected to the electrical and optical connectors. The outer casing may be moved relative to the electronics housing. Another implementation is where the optical transceiver includes a rear plate connected to the electronics housing. A first spring has one end at the rear plate and an opposite end against a first tab of the outer casing. Disengagement of the optical connector from the optical socket causes the first spring to compress. The optical transceiver also includes a second spring having one end at the rear plate and an opposite end against a second tab of the outer casing. Disengagement of the electrical connector from the electrical socket causes the second spring to compress. Another implementation is where the optical connector has a shorter distance between the extended and retracted position than the distance of the electrical connector between the extended and retracted position. The optical connector is engaged with the optical socket before the electrical connector is engaged with the electrical socket. Another implementation is where the optical transceiver further includes an electrical latch component connected to the electrical connector, the electrical latch component including a latching mechanism mateable with the electrical socket. Another implementation is where the electrical socket includes a cage having a prong. The latching mechanism of the electrical latch component is a hook member fitting in an indentation in the electronics casing. The hook member prevents the prong from flexing away from the electrical latch component when the electrical socket is connected to the electrical connector. Another implementation is where the optical transceiver includes an optical latch component connected to the optical connector. The optical latch component includes a latching mechanism mateable with the optical socket. Another implementation is where the latching mechanism is a tab that prevents a prong of the optical socket from flexing away from the optical latch component when the optical socket is connected to the optical connector. Another implementation is where the optical transceiver includes electronics housed in the electronic housing for converting electrical signals to optical signals. Another implementation is where the electronics housing includes a first arm section holding the optical connector and a parallel second arm section holding the electrical connector. Another implementation is where the optical socket is one of a plurality of optical sockets on an optical switch and wherein the electrical socket is one of a plurality of electrical sockets on the optical switch.

Another disclosed example is an optical switch having an optical socket carrying optical signals and an electrical socket carrying electrical signals. The optical and electrical sockets are configured to receive data from each other. The optical transceiver includes an attachable optical transceiver coupling the electrical socket with the optical socket. The optical transceiver includes an electrical connector and an optical connector. The optical transceiver includes an electronics housing holding the electrical and optical connectors in relative position to each other. This allows the simultaneous connection to the electrical socket and the optical socket. The electrical and optical connectors may be moved between an extended position and a retracted position relative to the electronics housing when being engaged or disengaged with respective electrical and optical sockets.

Another disclosed example is an optical transceiver for connection of an optical socket to an electrical socket. The optical transceiver includes an electronics housing having a first arm section and a parallel second arm section. The optical transceiver includes an optical connector and an optical connector latching mechanism housed in the first arm section and attached to the optical connector. The optical latching mechanism is moveable between an extended and retracted position. The optical transceiver includes an electrical connector connected to an electrical connector latching mechanism housed in the second arm section. The electrical latching mechanism is moveable between an extended and retracted position. A handle is connected to the optical connector latching mechanism and the electrical connector latching mechanism.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

FIG. 5C is a perspective close-up bottom view of the latching mechanism of the electrical connector of the example optical transceiver assembly engaged with an electrical socket, according to certain aspects of the present disclosure;

FIG. 6C is a perspective close-up bottom view of the latching mechanism of the electrical connector of the example optical transceiver disengaging from the electrical socket, according to certain aspects of the present disclosure.

DETAILED DESCRIPTION

Figure 1A:
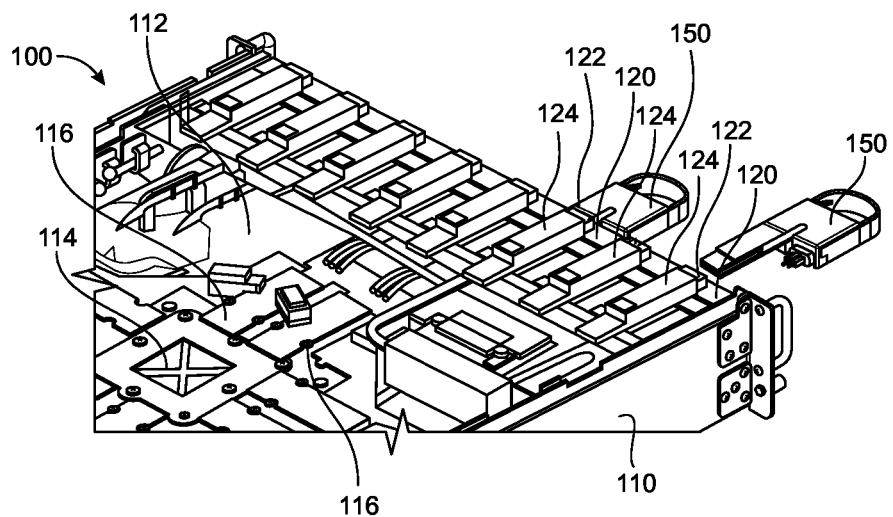
FIG. 1A is a perspective cutaway view of an optical switch that is connected to an example optical transceiver assembly, according to certain aspects of the present disclosure.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

The present disclosure is directed toward an optical transceiver assembly that has an optical connector and an electrical connector. The optical transceiver allows simultaneous connection of the optical connector to an optical signal socket and the electrical connector to an electrical signal socket. The optical transceiver allows the optical connector to be connected before the electrical signal connector to insure the correct order of connection. The optical transceiver includes a handle that allows a user to engage and disengage the optical and electrical connectors to the corresponding sockets on an optical signal device such as an optical switch. The optical and electrical connectors may be moved relative to a housing of the optical transceiver assembly. Pulling the handle disengages the connectors from the socket and then allows the housing of the optical transceiver assembly to be pulled away.

FIG. 1A shows a perspective cutaway view of an example optical communication device, which in this example is an optical switch 100. The optical switch 100 includes a housing 110 that holds support components, such as power supplies, fans, memory devices, and controllers. The optical switch 100 routes optical signals transmitted and received from optical fibers to external networked devices such as servers. The optical switch 100 is based on a co-packaged optics assembly that manages transmitting and receiving optical signals from optical fibers. A controller, such as a processor, functions to switch signals between optical fibers and conventional electrical signal ports. The optical switch 100 allows high speed switching of signals between different nodes in a network environment, such as a data center.

The optics assembly includes a high-density organic substrate circuit board 112, a switching logic controller 114, and optical modules 116. In this example, there are sixteen optical modules 116 arrayed in groups of four on the circuit board 112. In this example, the optical modules 116 are arranged around the switching logic controller 114. The switching logic controller 114 in this example is an application specific integrated circuit (ASIC) that includes switching logic for routing signals between the optical modules 116 through the connection pins. Each of the optical modules 116 has three fiber array ports on one side that faces outward from the logic controller 114. One of the fiber array ports transmits optical signals, while a second fiber array port receives optical signals. The third fiber array port is optically connected to an external light source module to receive a continuous wave laser signal to drive the optics module 116. Each of the optical modules 116 is optically coupled to a series of fiber array ports or optical sockets 120. In this example, the optical sockets are Multi-fiber Pull Off (MPO) sockets, but other types of optical sockets may be used. The optical switch 100 has a controller such as a central processing unit that also is coupled to standard electrical interface circuitry that is connected to electrical signal ports 122. In this example, the electrical signal ports 122 are QSFP sockets that each include a cage 124 that allows the insertion of QSFP connectors. Other types of electrical signal connectors may be used.

Figure 1B:
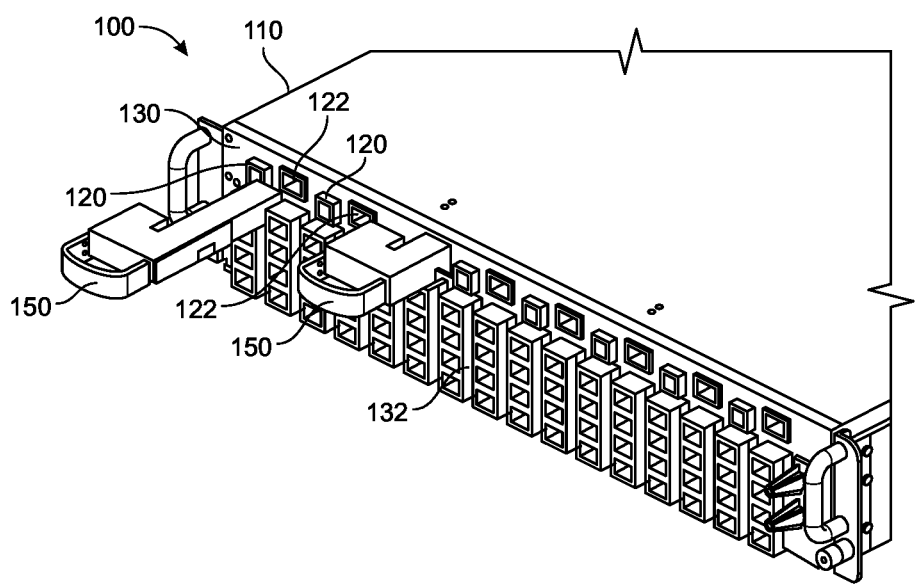
FIG. 1B is a perspective front view of the optical switch in FIG. 1A that is connected to the example optical transceiver assembly, according to certain aspects of the present disclosure.

FIG. 1B is a perspective view of the housing 110 of the optical switch 100 in FIG. 1A showing a rear panel 130 that holds the optical sockets 120. The series of electrical sockets 122 are interposed between the optical sockets 120 on the top row of the rear panel 130. Electrical signals from the electrical sockets 122 may be converted to optical signals for the optical sockets 120. Another series of optical network sockets 132 is arrayed below the row of optical sockets 120 and electrical sockets 122. The network sockets 132 allow communication to networked nodes such as servers that are connected to the optical switch 100 via optical fiber cables.

In this example, high-speed optical signals from one of the optical sockets 120 may be converted to lower speed electrical signals received by one of the electrical sockets 122. Similarly, lower speed electrical signals transmitted by one of the electrical sockets 122 may be converted to high-speed optical signals received by one of the optical sockets 120. In order to connect one of the optical sockets 120 to a neighboring electrical socket 122, an example optical transceiver assembly 150 may be inserted to connect one of the optical sockets 120 with one of the neighboring electrical sockets 122. FIGS. 1A-1B show an example optical transceiver assembly 150 attached to the optical switch 100 on the rear panel 130 and an optical transceiver assembly 150 detached from the optical switch 100.

Figure 2A:
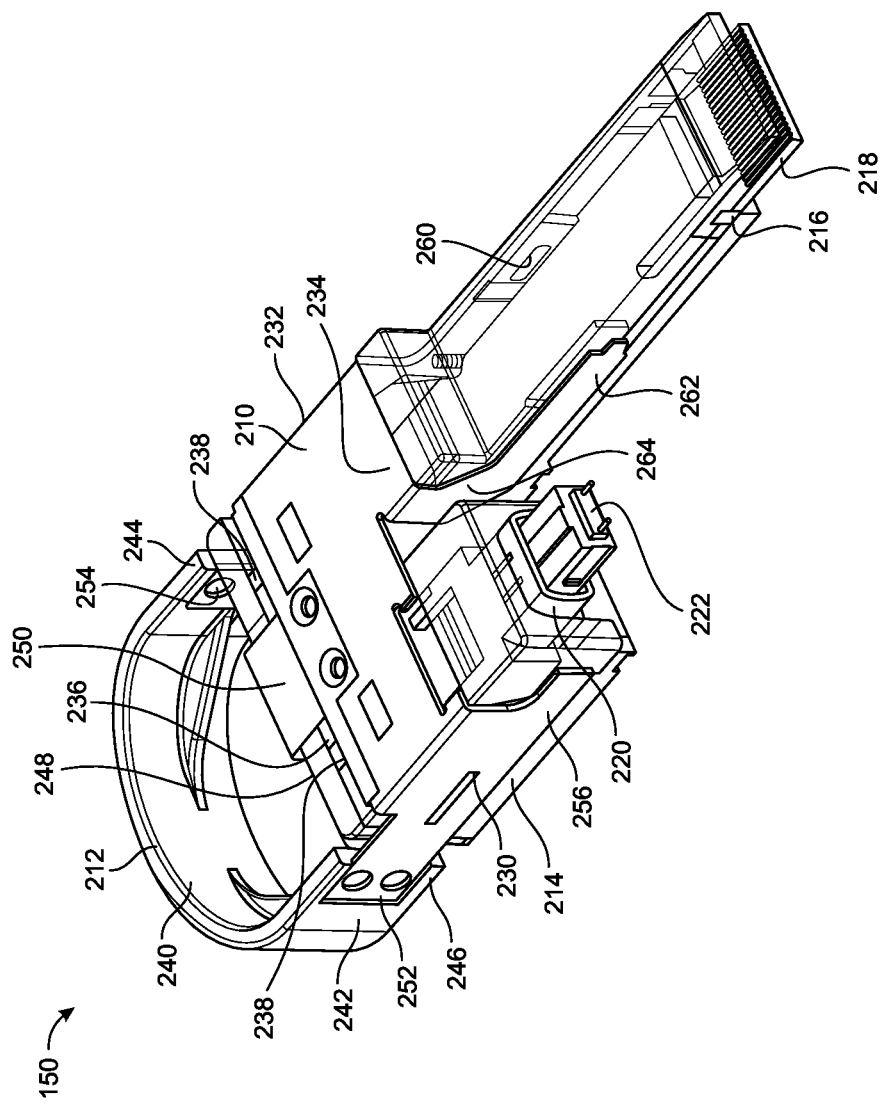
FIG. 2A is a top perspective view of an example dual connector optical transceiver assembly shown in FIGS. 1A-1B, according to certain aspects of the present disclosure.
Figure 2B:
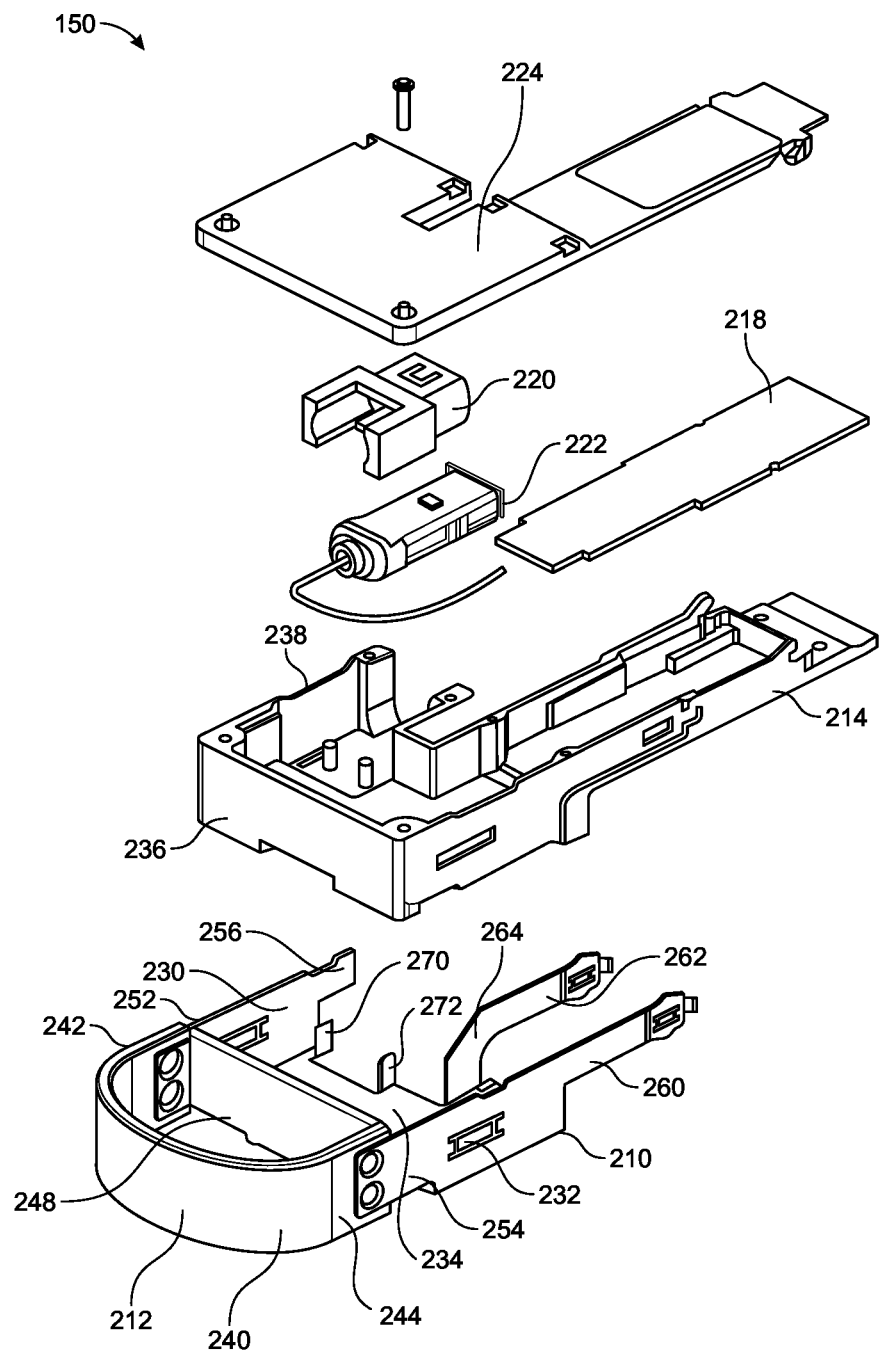
FIG. 2B is an exploded bottom perspective view of the parts of the example dual connector optical transceiver in FIG. 2A.
Figure 3A:
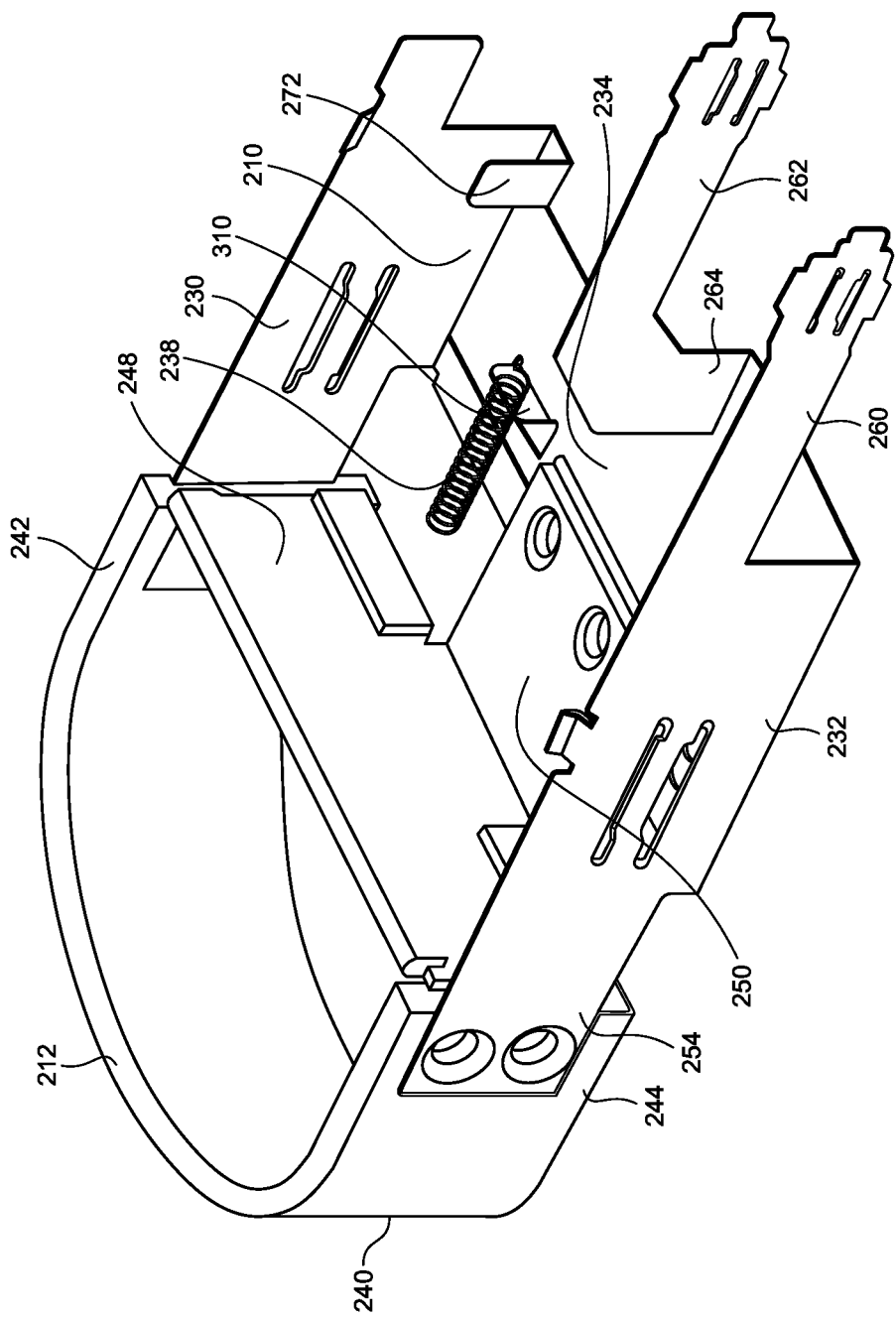
FIG. 3A is a top perspective to view of the handle and outer casing assembly of the example dual connector optical transceiver assembly in FIGS. 1A-1B.
Figure 3C:
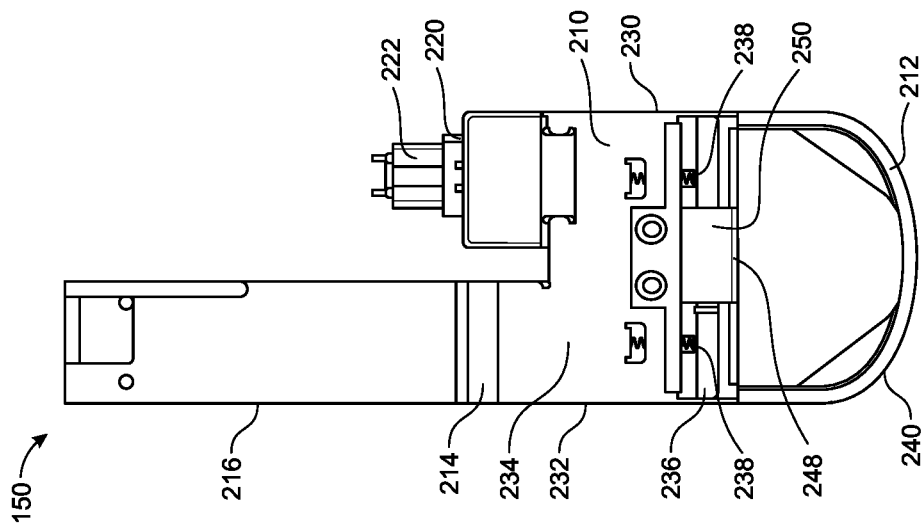
FIG. 3C is a bottom view of the example optical transceiver assembly, according to certain aspects of the present disclosure.
Figure 3B:
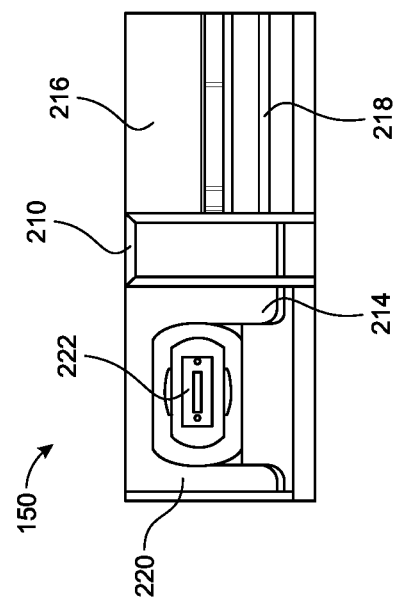
FIG. 3B is a front view of the example optical transceiver assembly, according to certain aspects of the present disclosure.
Figure 3E:
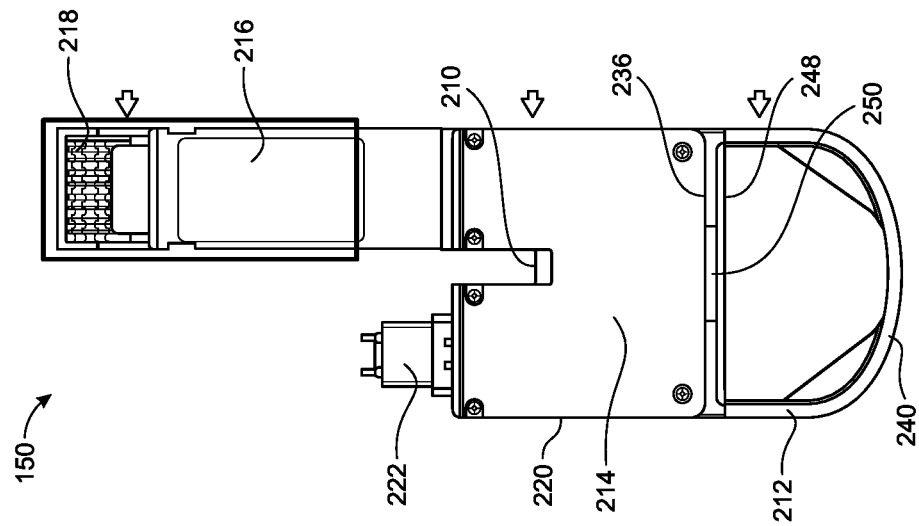
FIG. 3E is a top view of the example optical transceiver assembly, according to certain aspects of the present disclosure.
Figure 3D:
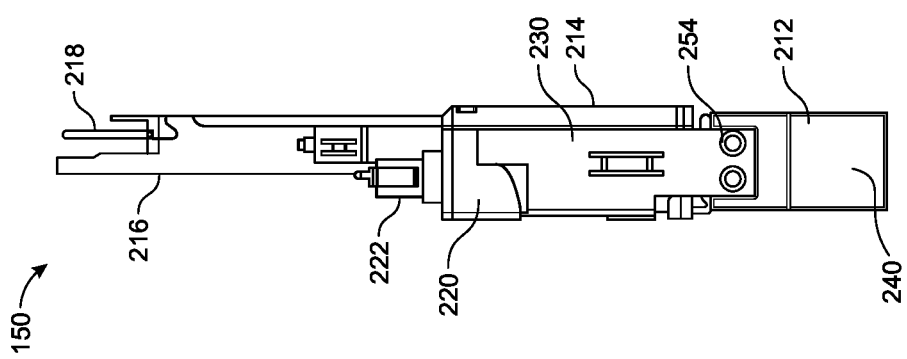
FIG. 3D is a side view of the example optical transceiver assembly, according to certain aspects of the present disclosure.

FIG. 2A is a perspective view of the example dual optical transceiver assembly 150 in FIGS. 1A-1B. FIG. 2B is a perspective exploded view of the parts of the example transceiver assembly 150. FIG. 3A is a top perspective view of the outer casing 210 and handle 212. FIG. 3B is a front view of the example optical transceiver assembly 150. FIG. 3C is a bottom view of the example optical transceiver assembly 150. FIG. 3D is a side view of the example optical transceiver assembly 150. FIG. 3E is a top view of the example optical transceiver assembly 150. In reference to FIGS. 2A-2B and 3A-3E, the optical transceiver assembly 150 is a two-in-one connector carrier for connection of an optical socket to an electrical socket. The example optical transceiver assembly 150 includes an outer casing 210, a handle 212, an electronics housing 214, a QSFP latching mechanism 216, a QSFP connector 218, a MPO latching mechanism 220, and an MPO connector 222. The example optical transceiver assembly 150 has a two in one connector configuration that includes the QSFP connector 218 for electronic signals and an MPO connector 222 for optical signals. The electronics housing 214 contains circuits that convert electrical signals from the QSFP connector 218 to optical signals for the MPO connector 222. The electronics housing 214 has a bottom panel and walls that are enclosed by a cover plate 224. The bottom panel of the electronics housing 214 has various slots that allow registration features of the outer casing to attach to the QSFP latching mechanism 216 and MPO latching mechanism 220. The cover plate 224 may be attached to the electronics housing 214 through fastening devices such as screws. The outer casing 210 is attached to the QSFP latching mechanism 216 and the MPO latching mechanism 220 and moves relative to the electronics housing 214. The handle 212 is connected to the QSFP latching mechanism 216 and the MPO latching mechanism 220 via the outer casing 210 to assist in plugging in the optical transceiver assembly 150. The structure of the optical transceiver assembly 150 allow the connection of the QSFP and MPO sockets 122 and 120 in sequence, as the optical transceiver assembly 150 is attached to the optical switch 100 as shown in FIG. 1A.

The casing 210 of the optical transceiver assembly 150 includes side walls 230 and 232 joined by a bottom plate 234. The casing 210 is attached to the electronics housing 214 to cover the electronics housing 214. A rear plate 236 attached to the sides of the electronics housing 214 provides a stop for one end of two springs 238. The springs 238 are installed in channels formed on the bottom panel of the electronics housing 214. The QSFP latching mechanism 216 and the MPO latching mechanism 220 are fixably attached to the handle 212 via the outer casing 210. Thus, the latching mechanisms 216 and 220, outer casing 210, and the handle 212, all move relative to the electronics housing 214. The opposite ends of the springs 238 contact tabs extending from the bottom plate 234 of the outer casing 210.

The handle 212 includes a curved grip section 240 that has two opposing ends 242 and 244. Each of the opposite ends 242 and 244 include an exterior slot 246. The grip section 240 includes a cross-bar member 248 that connects the ends 242 and 244. A connection member 250 extends from the cross-bar member 248 to connect the handle 212 with a mating registration feature in the outer casing 210. The connection member 250 moves through an aperture in the rear plate 236. Each of the side walls 230 and 232 has respective extending end tabs 252 and 254 that are inserted in the slots 246 of the ends 242 and 244 of the handle 212. The slots 246 of the handle 212 may be secured to the end tabs 252 and 254 via rivets, screws or other connectors.

The side wall 230 of the outer casing 210 includes interior registration features that contact the electronics housing 214 to guide the movement of the outer casing 210 relative to the electronics housing. The opposite end of the side wall 230 from the end tab 252 includes a guide tab 256 that assists in keeping the casing 210 in position relative to the electronics housing 214. The side wall 232 of the outer casing 210 includes interior registration features that guide the movement of the outer casing 210 relative to the electronics housing. A guide tab 260 extends from the end of the side wall 232 opposite from the end tab 254. An opposite guide tab 262 extends parallel to the guide tab 260. The top plate 234 includes a cutout parallel to the side wall 232 that includes a support arm 264 extending downward that supports the guide tab 262. The guide tabs 260 and 262 includes interior registration features that guide the movement of the outer casing 210 relative to the part of the electronics housing 214 holding the QSFP latching mechanism 216.

The MPO latching mechanism 220 is attached to the outer casing 210 and may be moved relative to the electronics housing 214 by moving the handle 212. The bottom plate 234 of the outer casing 210 has two upward extending tabs 270 and 272. The tabs 270 and 272 extend through slots in the bottom panel of the electronics housing 214 and are mated with registration features of the MPO latching mechanism 220. The QSFP latching mechanism 216 is attached to the outer casing 210 registration features on the interior sides of the guide tabs 260 and 262 that face the QSFP latching mechanism 216. The QSFP latching mechanism 216 may thus be moved relative to the electronics housing 214 by moving the handle 212. As shown in FIG. 3A, the bottom plate 234 includes two stop tabs 310 that extend through corresponding slots in the bottom panel of the electronics housing 214. The stop tabs 310 hold one end of the springs 238. Thus, moving the outer casing 210 may compress the springs 238 between the stop tabs 310 and the rear plate 236 of the electronics housing 214.

Figure 3F:
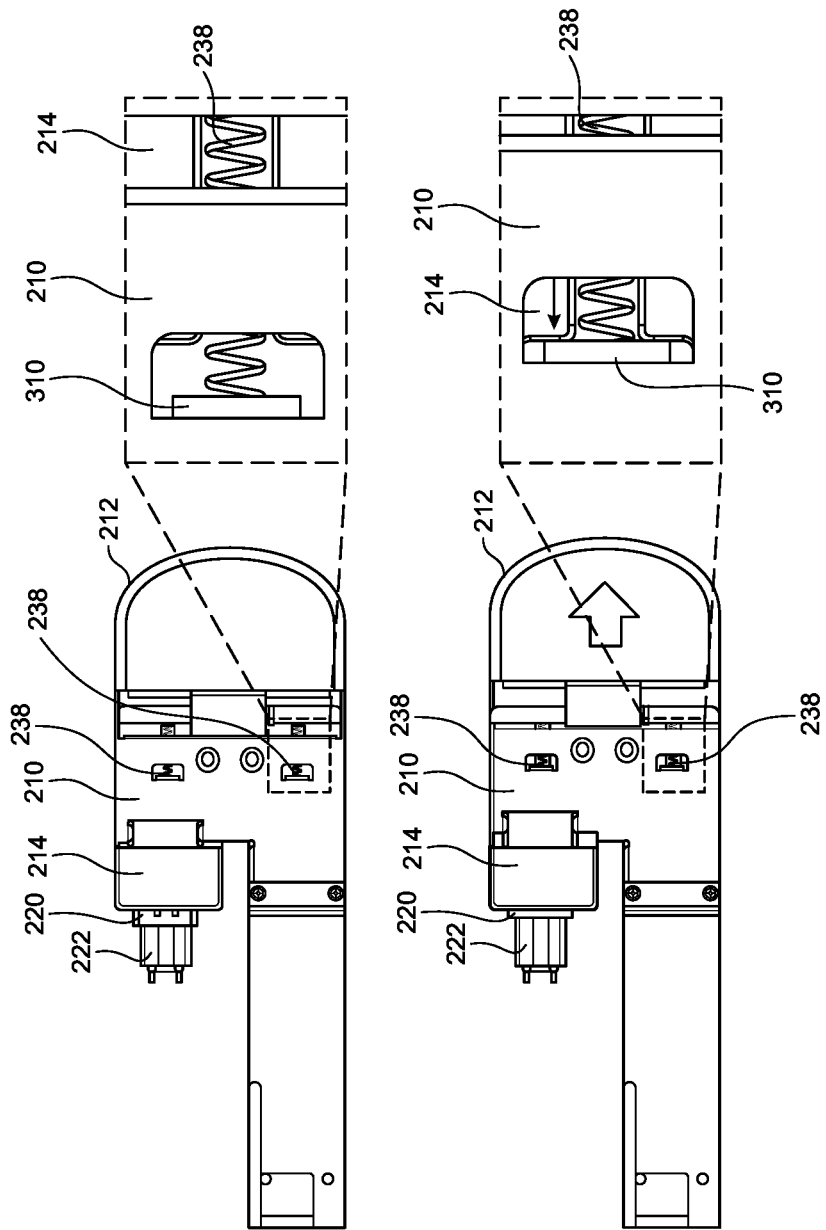
FIG. 3F is a bottom view of the outer casing moving the electrical and optical connectors relative to the electronics housing of the example optical transceiver assembly, according to certain aspects of the present disclosure.

As will be explained, the QSFP latching mechanism 216 and the MPO latching mechanism 220 may move between an extended position and a retracted position relative to the electronics housing 214. FIG. 3F shows the positioning of the outer casing 210 between the extended position and retracted position of the QSFP latching mechanism 216 and the MPO latching mechanism 220.

The spring tension of the springs 238 in the free state normally keeps the QSFP latching mechanism 216 and the MPO latching mechanism 220 in the extended position as shown at the top of FIG. 3F. Pulling the handle 212 moves the QSFP latching mechanism 216 and the MPO latching mechanism 220 to the retracted position while compressing the springs 238 against the tabs 310. The tabs 310 contact stop features of the bottom panel of the electronics housing 214 in the fully retracted position as shown at the bottom of FIG. 3F.

Figure 4A:
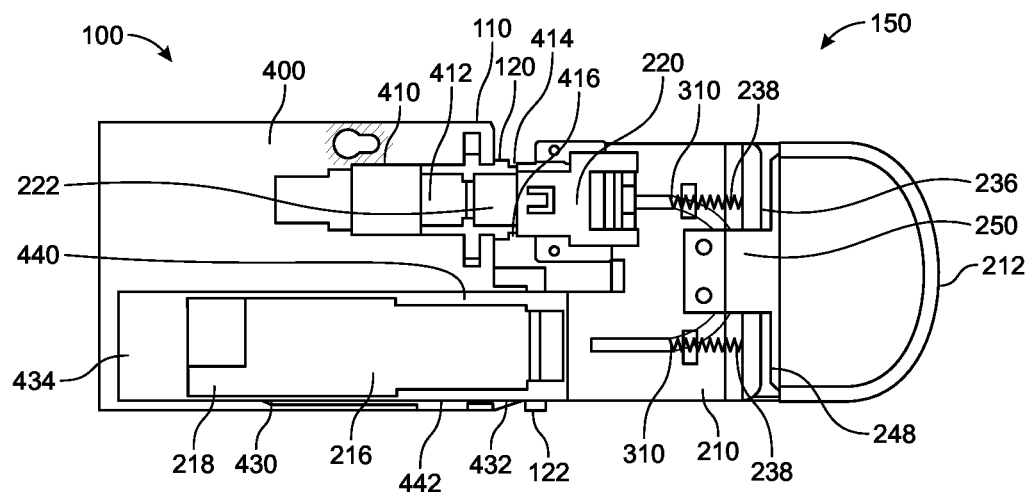
FIG. 4A is a bottom view of the example optical transceiver assembly attached to sockets, according to certain aspects of the present disclosure.
Figure 4B:
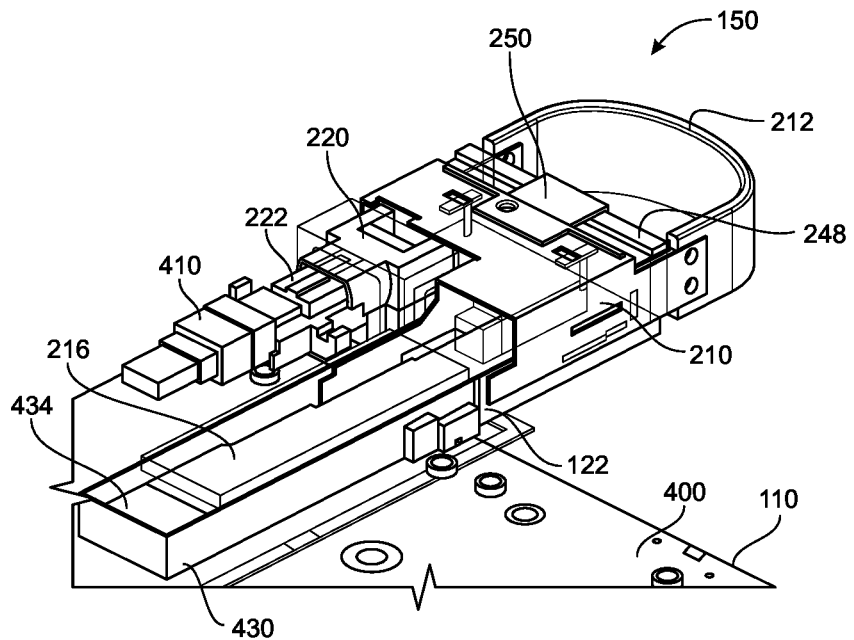
FIG. 4B is a bottom perspective view of the example optical transceiver attached to sockets, according to certain aspects of the present disclosure.

FIGS. 4A-4F are bottom and bottom perspective views that show the sequence of the removal of the optical transceiver assembly 150 from the optical switch 100 in FIG. 1. Like elements in FIGS. 4A-4F are labeled with identical reference numbers as their counterparts in FIGS. 1-3. FIGS. 4A-4B show the optical transceiver assembly 150 fully inserted into the housing 110 of the optical switch 100. The optical switch 100 includes a circuit board 400 that holds one of the MPO sockets 120 and one of the QSFP sockets 122. The MPO socket 120 has a main body 410 having optical interface electronics. The main body 410 includes a mating connector 412 and two prongs 414 and 416 that engage the MPO latching mechanism 220 to keep the MPO optical fibers in the MPO connector 222 in optical communication with the mating connector 412 of the MPO socket 120.

The QSFP socket 122 includes the cage 124 that has walls to guide the QSFP latching mechanism 216. The cage 124 has an open end 432 to allow the insertion of the QSFP latching mechanism 216. The opposite closed end of the cage 124 has a QSFP connector 434 that engages the QSFP connector 218 to permit electrical signal communication. The cage 124 has two prongs 440 and 442 near the open end 432 that engage the QSFP latching mechanism 216.

When the optical transceiver assembly 150 is inserted into the housing 110, the handle 212 is pushed in relative to the electronics housing 214. Thus, the springs 238 between the rear plate 236 of the electronics housing 214 and the tabs 310 are in a free state. In the inserted position, the QSFP latching mechanism 216 and MPO latching mechanism 220 are in the extended position relative to the electronics housing 214. The MPO latching mechanism 220 is thus engaged with the two prongs 414 and 416 and the QSFP latching mechanism 216 is engaged with the prongs 440 and 442.

The optical transceiver assembly 150 may be removed from the housing 110 by pulling the handle 212. The handle 212 moves the casing 210 and thus moves the attached QSFP latching mechanism 216 and MPO latching mechanism 220 to the retraced position and compresses the springs 238 between the tabs 310 and the rear plate 236. By retracting the QSFP latching mechanism 216 and MPO latching mechanism 220, the MPO latching mechanism 220 is disengaged from the two prongs 414 and 416 and the QSFP latching mechanism 216 is disengaged from the prongs 440 and 442.

Figure 4C:
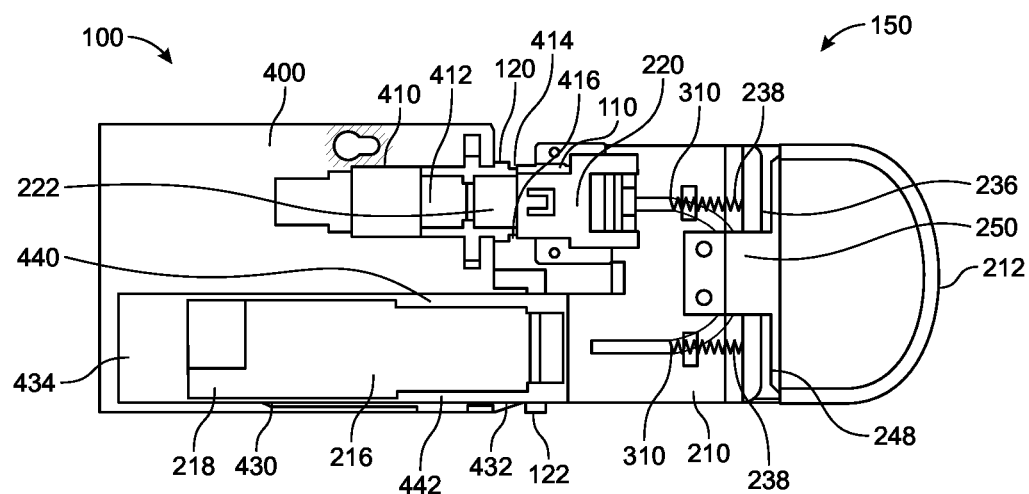
FIG. 4C is a bottom view of the example optical transceiver assembly disengaged from the sockets to allow removal of the optical transceiver assembly, according to certain aspects of the present disclosure.
Figure 4D:
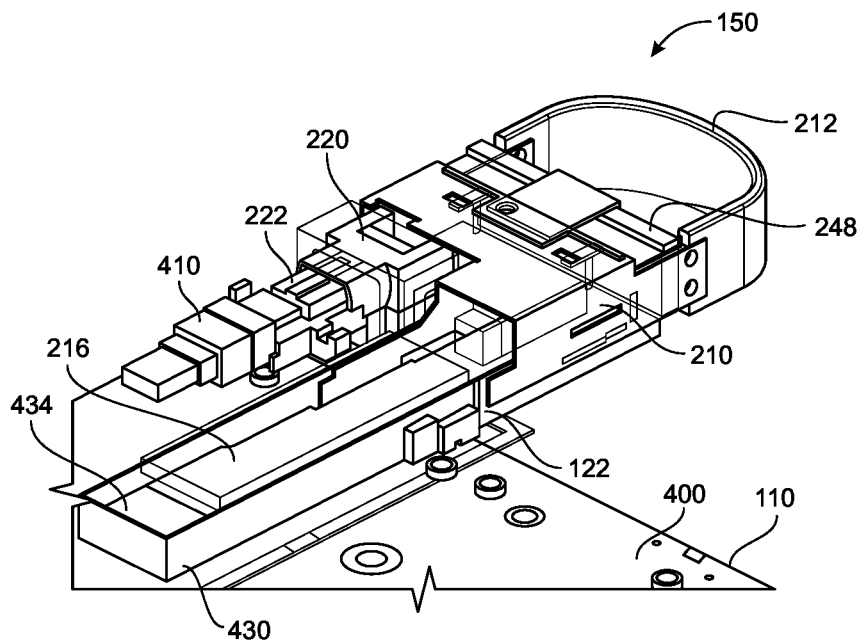
FIG. 4D is a bottom perspective view of the example optical transceiver disengaged from the sockets to allow removal of the optical transceiver assembly, according to certain aspects of the present disclosure.

FIGS. 4C-4D show the optical transceiver assembly 150 when a user pulls the handle 212 and the outer casing 210 away from the rear plate 236. Pulling the handle 212 causes the casing 210 to move the QSFP latching mechanism 216 and MPO latching mechanism 220 to the retracted position, relative to the electronic housing 214. Since the QSFP latching mechanism 216 and the MPO latching mechanism 220 are attached to the handle 212 and the outer casing 210, they are moved toward the rear plate 236. The tabs 310 of the outer casing 210 compress the springs 238 against the rear plate 236.

Movement of the QSFP latching mechanism 216 to the retracted position within the electronics housing 214 detaches the prongs 440 and 442 and thus the QSFP connector 218 is disengaged from the QSFP socket 122. Simultaneously, movement of the MPO latching mechanism 220 to the retracted position within the electronics housing 214 detaches the prongs 414 and 416, and thus the MPO connector 222 is disengaged from the MPO socket 120.

Figure 4E:
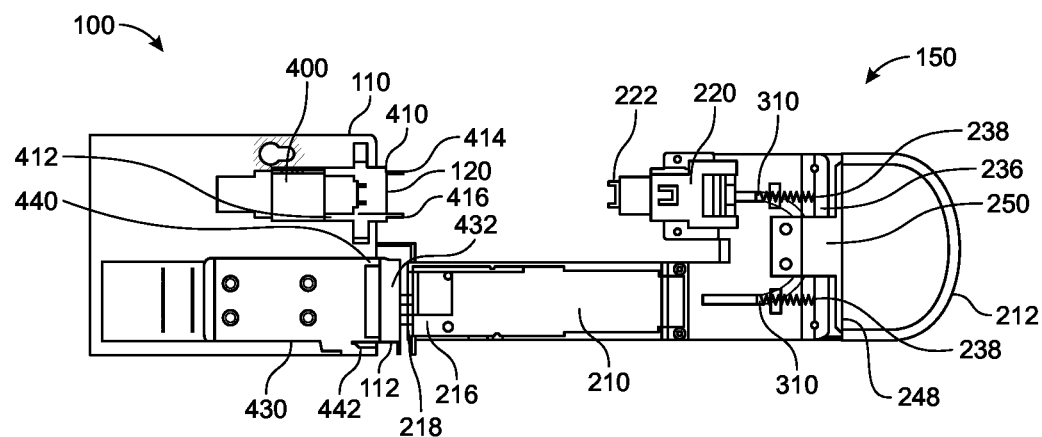
FIG. 4E is a bottom view of the example optical transceiver assembly removed from an optical switch, according to certain aspects of the present disclosure.
Figure 4F:
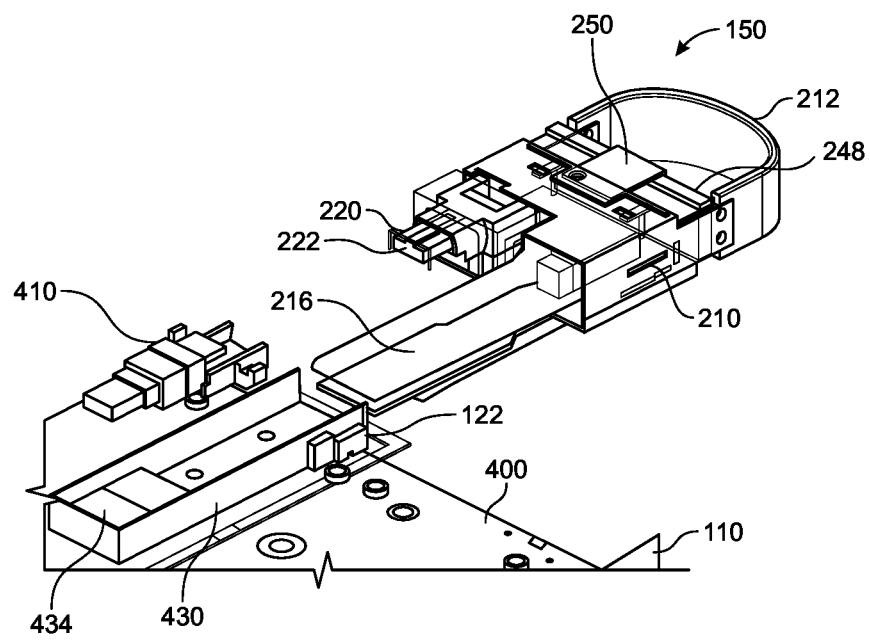
FIG. 4F is a bottom perspective view of the example optical transceiver assembly removed from an optical switch, according to certain aspects of the present disclosure.

Once the QSFP latching mechanism 216 and the MPO latching mechanism 220 are disengaged from the QSFP socket 122 and the MPO socket 120, the pulling force from the handle 212 causes the QSFP latching mechanism 216 and MPO latching mechanism 220 to be fully retracted and move the electronics housing 214 away from the sockets 120 and 122. The optical transceiver assembly 150 may thus be fully removed as shown in FIGS. 4E-4F. When the optical transceiver assembly 150 is fully removed, the handle 212 and casing 210 are no longer pulled away from the electronics housing 214. The springs 238 thus return to a free state and the QSFP latching mechanism 216 and the MPO latching mechanism 220 return to the extended position in the electronics housing 214.

Reinserting the optical transceiver assembly 150 involves gripping the handle 212 and pushing the QSFP latching mechanism 216 and the MPO latching mechanism 220 into the corresponding QSFP socket 122 and the MPO socket 120. The optical transceiver assembly 150 may be pushed forward toward the housing 110. The MPO latching mechanism 220 has a shorter distance between the extended and retracted position than the distance of the QSFP latching mechanism 216 between the extended and retracted position. The MPO connector 222 is flexible and thus may be compressed after the MPO latching mechanism 220 engages the MPO socket 120. The length of the stroke of expansion and retraction of the MPO connector 222 matches the swipe distance of connection of golden fingers in the QSFP connector 218. Thus, the prongs 414 and 416 engage the MPO latching mechanism 220 first. The MPO connector 222 is compressed while the optical transceiver assembly 150 is moved forward until the prongs 440 and 442 engage the QSFP latching mechanism 216 as shown in FIGS. 4A-4B. In this manner, the optical connection through the MPO socket 120 is made first and then the electrical signal connection through the QSFP socket 122 is made. This ensures that the connection sequence of making optical connection first and then the electrical connection is properly followed automatically with the design of the optical transceiver assembly 150.

Figure 5A:
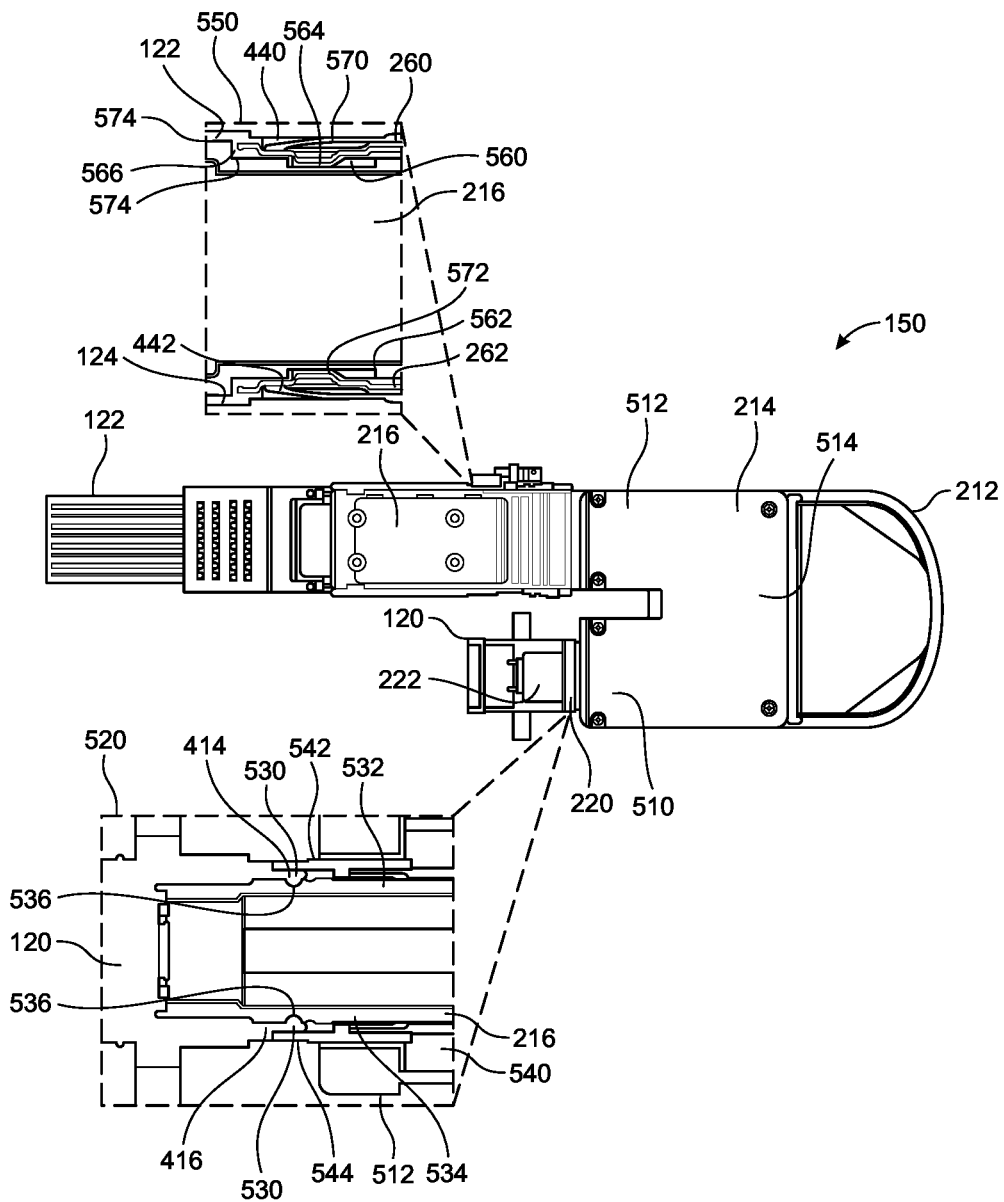
FIG. 5A shows a close-up top view of the latching mechanisms of the two connectors of the example optical transceiver assembly engaged with the respective sockets, according to certain aspects of the present disclosure.
Figure 5B:
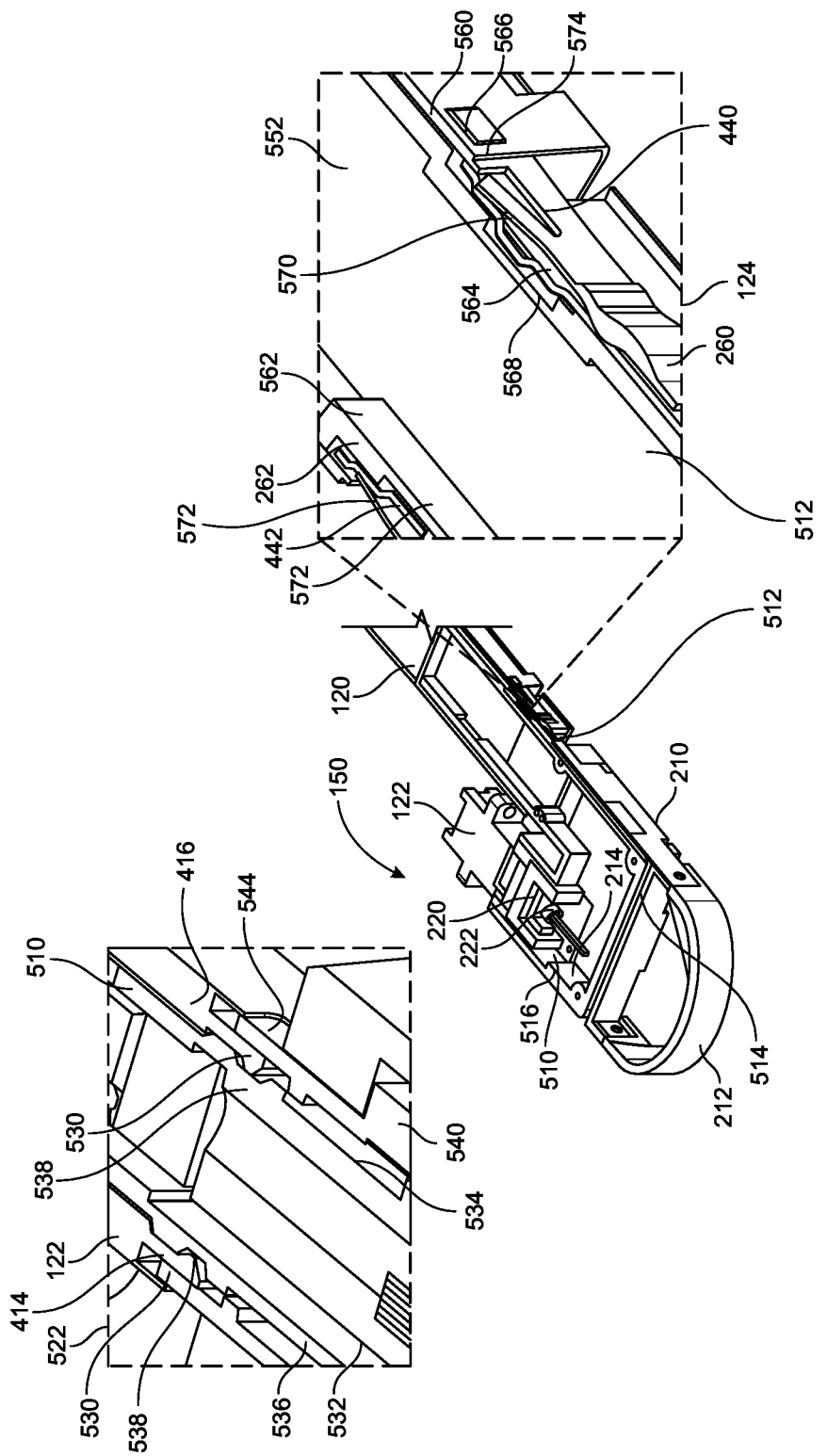
FIG. 5B is a perspective close-up view of the latching mechanisms of the optical connector of the example optical transceiver assembly engaged with the respective sockets, according to certain aspects of the present disclosure.

FIGS. 5A-5B are top and perspective top views of the example optical transceiver assembly 150 that show the engagement of the QSFP latching mechanism 220 and the MPO latching mechanism 216 into the corresponding QSFP socket 122 and the MPO socket 120. FIG. 5C is a close-up perspective bottom view of the QSFP latching mechanism 216 engaged with the QSFP socket 122. Like elements in FIGS. 5A-5C are labeled with identical reference numbers as their counterparts in FIGS. 1-2. As shown in FIGS. 5A-5B, the electronics housing 214 includes a first arm section 510 that has interior registration features that hold the MPO latching mechanism 220 and a second arm section 512 that has interior registration features that hold the QSFP latching mechanism 216. A lateral section 514 joins the arm sections 510 and 512 and holds electronics (not shown) for conversion of electrical signals to optical signals. The parallel interior walls of the first arm section 510 allow the MPO latching mechanism 220 to move between the retracted and extended positions. The movement of the MPO latching mechanism 220 away from the extended position is limited by a backstop 516 shown in FIG. 5B. Part of the QSFP latching mechanism 216 extends out from the second arm section 512 to engage a mating QSFP socket such as the QSFP socket 122. The parallel interior walls of the second arm section 512 provide a guide for the QSFP latching mechanism 216 to move between the extended position and the retracted position. The stop tabs 310 of the outer casing 210 shown in FIG. 3A contact corresponding stops formed on the bottom panel of the electronics housing 214 that stops the outer casing 210 and attached QSFP latching mechanism 216 and the MPO latching mechanism 220 short of the back plate 236.

As shown in a close up inset 520 in FIG. 5A and a close up inset 522 in FIG. 5B, the MPO socket 120 includes the two prongs 414 and 416 that each have one end defined by a hook member 530. The MPO latching mechanism 220 includes an interior housing 532 having two opposing sides 534 and 536. The sides 534 and 536 each have a notch 538 that fits the hook members 530 of the respective prongs 414 and 416. When the MPO latching mechanism 220 is pushed fully into the MPO socket 120, the hook members 530 of the prongs 414 and 416 mate with the notches 538 on the sides 534 and 536 of the interior housing 532. An exterior casing 540 of the MPO latching mechanism 220 encases the interior housing 532. The exterior casing 540 includes parallel tabs 542 and 544 that extend from one end of the casing 540. When the MPO latching mechanism 220 is in the extended position, the parallel tabs 542 and 544 are positioned over the prongs 414 and 416 of the MPO socket. In the extended positions, the tabs 542 and 544 hold the hook members 530 in the notches 538.

Similarly, as shown in a close up inset 550 in FIG. 5A and a close up inset 552 in FIG. 5B, the cage 124 of the QSFP socket 122 includes the two prongs 440 and 442 that are cut from respective sides of the cage 124. Each of the prongs 440 and 442 thus may flex inward from the sides of the cage 124. As shown in FIG. 5C, the arm section 512 includes two opposing sides 560 and 562 that hold the QSFP latching mechanism 216. The QSFP latching mechanism 216 moves between the interior surfaces of the opposing sides 560 and 562 between the extended and retracted position. The exterior surface of both of the sides 560 and 562 include an indentation 564 that defines a stop end 566. A central indentation 568 is formed in the indentation 564. The guide tabs 260 and 262 of the outer casing 210 each include respective hook members 570 and 572 that fit within the slot created between the interior side surface of the cage 124 and the indentation 564. The lateral motion of the hook members 570 and 572 are stopped against the stop ends 566. The end of the hook members 570 and 572 include a triangular extension tab 574 that abuts against the stop ends 566. The hook members 570 and 572 each have an elongated body that includes sections that fit within the indentation 564 and the central indentation 568. Because of the indentations 564 and 568, the hook members 570 and 572 fit under the respective prongs 440 or 442 to allow the prongs 440 and 442 to flex inward and engage the extension tabs 574 of the respective hook members 570 and 572. Thus, when the QSFP latching mechanism 216 is pushed fully into the QSFP socket 122, the hook members 570 and 572 are held in place by the prongs 440 and 442 flexing inward and contacting the respective extension tabs 574.

Figure 6A:
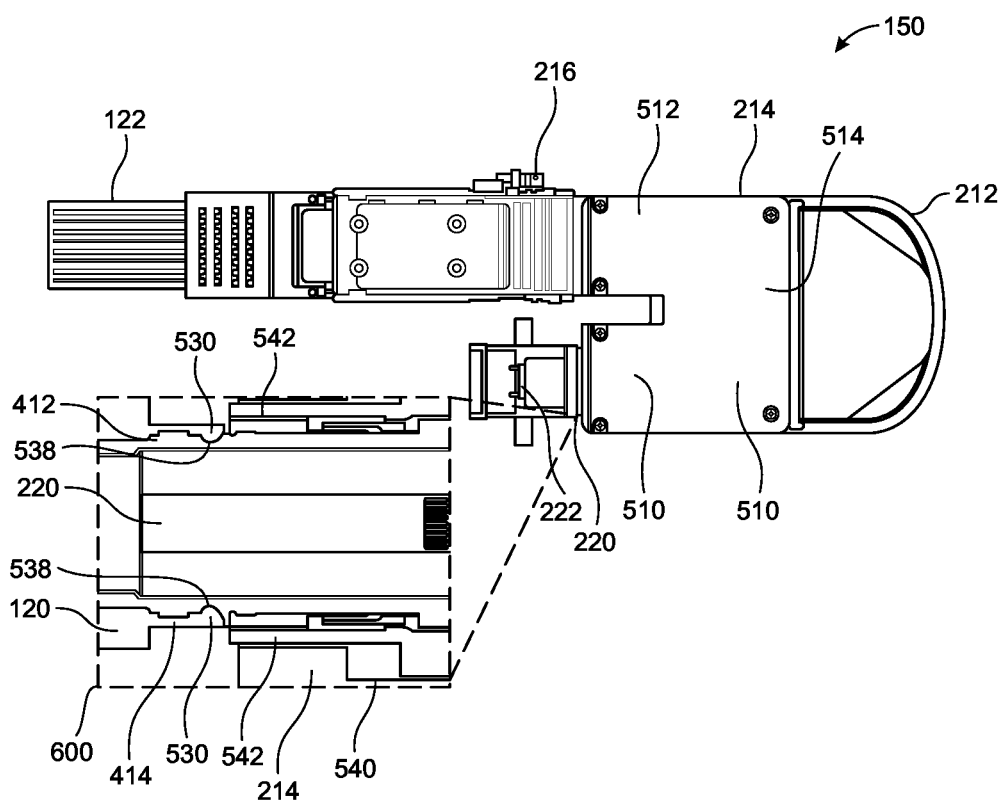
FIG. 6A shows a close-up top view of the latching mechanism of the two connectors of the example optical transceiver assembly disengaged from the respective sockets, according to certain aspects of the present disclosure.
Figure 6B:
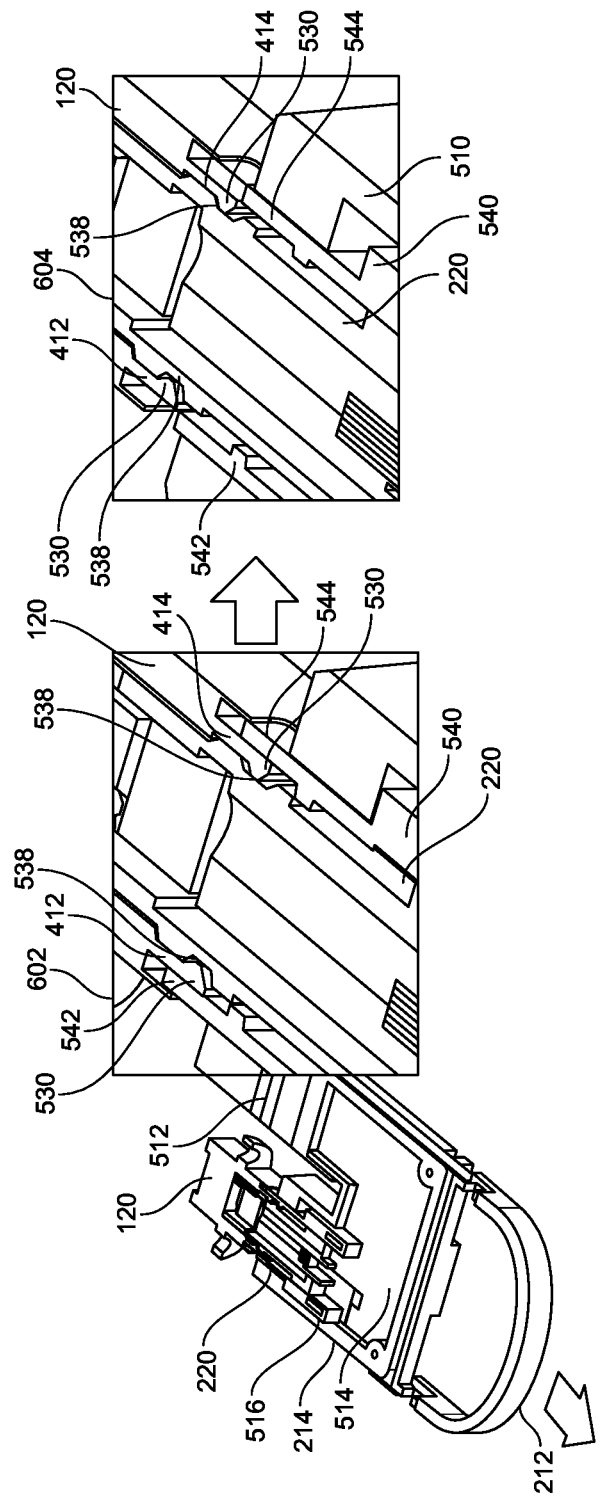
FIG. 6B is a perspective close-up top view of the latching mechanism of the optical connector of the example optical transceiver in an engaged and released position, according to certain aspects of the present disclosure.

When the handle 212 of the optical transceiver assembly 150 is pulled, the locking mechanisms are unlocked between the sockets 120 and 122 and the latching mechanisms 216 and 220 as shown in FIGS. 6A-6B. Like elements in FIGS. 6A-6B are labeled with identical reference numbers as their counterparts in FIGS. 1-2. As shown in an inset 600 in FIG. 6A and an inset 602 in FIG. 6B, pulling the handle 212 in FIG. 5A causes the MPO latching mechanism 220 to be pulled away from the MPO socket 120 and the electronics housing 214. This results in the tabs 542 and 544 of the exterior casing 540 of the MPO latching mechanism 220 being pulled away from the prongs 412 and 414 of the MPO socket 120. Once the tabs 542 and 544 are pulled entirely away from the prongs 412 and 414 as shown in an inset 604, the prongs 412 and 414 may be flexed outward and therefore allow the hook members 530 to be moved out of the notches 538. When the MPO latching mechanism 220 is pulled out, the sloped sides of the notches 538 force the hook members 530 of the prongs 414 and 416 out of the notches 538. In this manner, the MPO latching mechanism 220 may be detached from the MPO socket 120. As the handle 212 continues to be pulled, the MPO latching mechanism 220 is pulled into the backstop 516. Once the MPO latch mechanism 220 contacts the backstop 516, the electronic housing 214 also is pulled with the handle 212 to allow the entire optical transceiver assembly 150 to be pulled away.

Figure 6D:
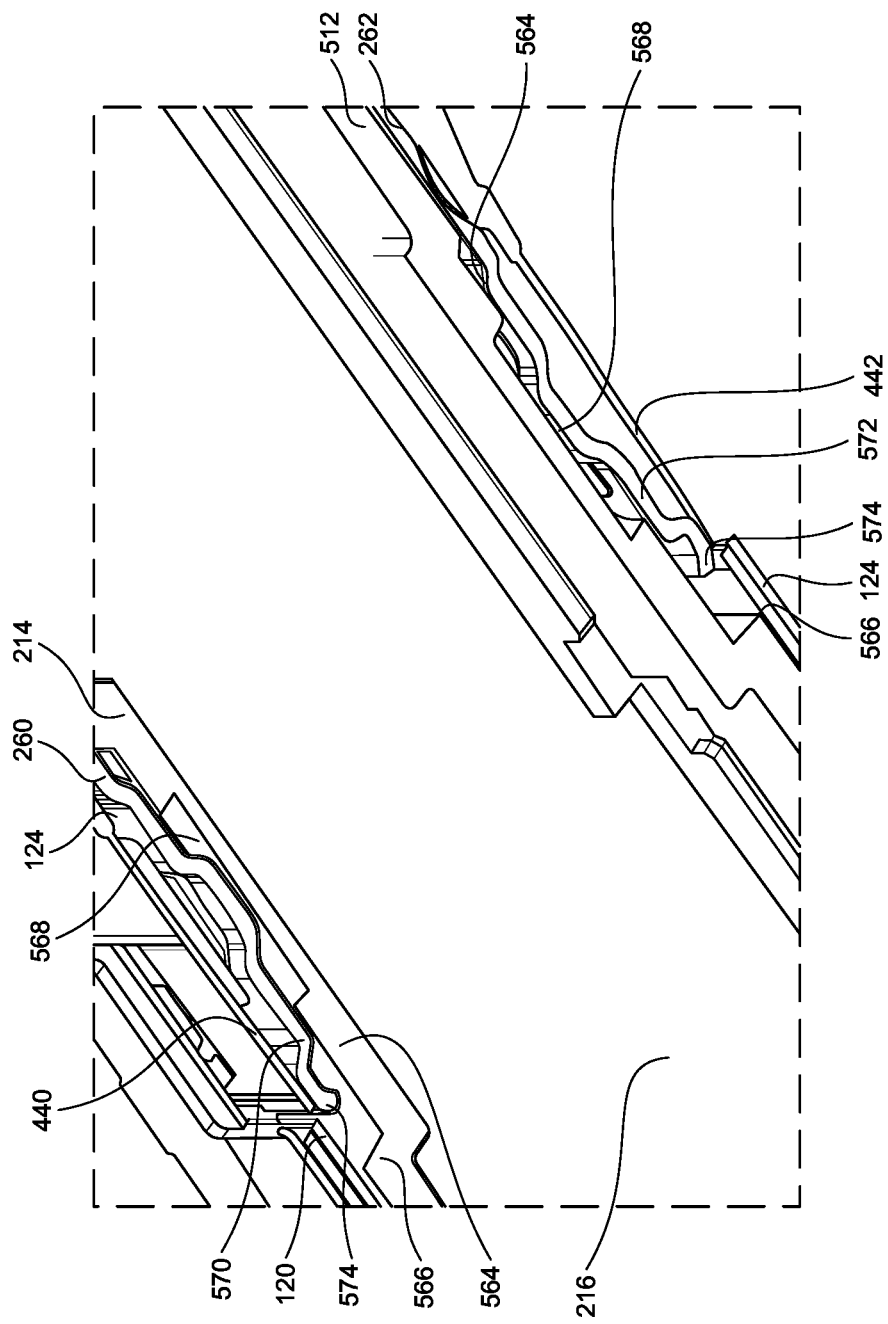
FIG. 6D is a perspective close-up bottom view of the latching mechanism of the electrical connector of the example optical transceiver assembly fully disengaged from the electrical socket, according to certain aspects of the present disclosure.

Similarly, FIGS. 6C and 6D show close-up perspective views of the disengagement of the QSFP latching mechanism 216 from the QSFP socket 122. As explained above, the QSFP latching mechanism 216 is pulled back to the retracted position relative to the electronics housing 214 via the handle 212 in FIG. 5A. When the QSFP latching mechanism 216 is pulled back, the hook members 570 and 572 of the respective tabs 260 and 262 of the outer casing 210 are pulled away from the stop end 566 of the indentation 564 on each of the sides 560 and 562 of the arm section 512 of the electronics housing 214, as shown in FIG. 6C. When the hook members 570 and 572 are pulled back further, the extension tab 574 is pulled back and pushes the prongs 440 and 442 on the sides of the cage 124 of the QSFP socket 122 to flex outward, thus releasing the hook members 570 and 572 of the tabs 260 and 262 of the outer casing 210 as shown in FIG. 6D. Since the tabs 574 are no longer fixed between the stop ends 566 and the prongs 440 and 442, the QSFP latch mechanism 216 is freely moveable. The QSFP latching mechanism 216 may thus be disengaged from the QSFP socket 122, and both the arm section 512 and QSFP latching mechanism 216 may be fully disengaged.

Since the arm sections 510 and 512 of the electronics housing 214 fix the QSFP latching mechanism 216 and the MPO latching mechanism 220 in position to each other, the optical transceiver assembly 150 allows the connection to optical and electrical sockets without the use of cables. The example optical transceiver described herein includes an MPO optical connector and a QSFP type electrical connector. However, other types of optical connectors such as External Laser Small Form Factor Pluggable (ELSFP) connectors may be incorporated in the example optical transceiver. Further, other types of electrical connectors such as QSFP-DD and SFP connectors may be incorporated in the example optical transceiver.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. An optical transceiver comprising:
   an electrical connector;
   an optical connector; and
   an electronics housing holding the electrical and optical connectors in relative position to each other, the electronics housing allowing the simultaneous connection to a respective electrical socket and an optical socket, wherein the electrical and optical connectors may be moved between an extended position and a retracted position relative to the electronics housing when being engaged or disengaged with respective electrical and optical sockets.

2. The optical transceiver of claim 1, wherein the electrical connector is a Quad Small Form-factor Pluggable (QSFP) connector.

3. The optical transceiver of claim 1, wherein the optical connector is a Multi-fiber Pull Off (MPO) connector.

4. The optical transceiver of claim 1, further comprising a handle coupled to the electrical and optical connectors.

5. The optical transceiver of claim 1, further comprising an outer casing connected to the electrical and optical connectors, wherein the outer casing is moveable relative to electronics housing.

6. The optical transceiver of claim 5, further comprising:
   a rear plate connected to the electronics housing;
   a first spring having one end at the rear plate and an opposite end against a first tab of the outer casing, wherein disengagement of the optical connector from the optical socket causes the first spring to compress; and
   a second spring having one end at the rear plate and an opposite end against a second tab of the outer casing wherein disengagement of the electrical connector from the electrical socket causes the second spring to compress.

7. The optical transceiver of claim 1, wherein the optical connector has a shorter distance between the extended and retracted position than the distance of the electrical connector between the extended and retracted position, wherein the optical connector is engaged with the optical socket before the electrical connector is engaged with the electrical socket.

8. The optical transceiver of claim 1, further comprising an electrical latch component connected to the electrical connector, the electrical latch component including a latching mechanism mateable with the electrical socket.

9. The optical transceiver of claim 8, wherein the electrical socket includes a cage having a prong, and wherein the latching mechanism is a hook member fitting in an indentation in the electronics casing, the hook member preventing the prong from flexing away from the electrical latch component when the electrical socket is connected to the electrical connector.

10. The optical transceiver of claim 1, further comprising an optical latch component connected to the optical connector, the optical latch component including a latching mechanism mateable with the optical socket.

11. The optical transceiver of claim 9, wherein the latching mechanism is a tab that prevents a prong of the optical socket from flexing away from the optical latch component when the optical socket is connected to the optical connector.

12. The optical transceiver of claim 1, further comprising electronics housed in the electronic housing for converting electrical signals to optical signals.

13. The optical transceiver of claim 1, wherein the electronics housing includes a first arm section holding the optical connector and a parallel second arm section holding the electrical connector.

14. The optical transceiver of claim 1, wherein the optical socket is one of a plurality of optical sockets on an optical switch and wherein the electrical socket is one of a plurality of electrical sockets on the optical switch.

15. An optical switch comprising:
   an optical socket carrying optical signals;
   an electrical socket carrying electrical signals, the optical and electrical sockets configured to receive data from each other;
   an attachable optical transceiver coupling the electrical socket with the optical socket, the optical transceiver including:
      an electrical connector;
      an optical connector; and
      an electronics housing holding the electrical and optical connectors in relative position to each other allowing the simultaneous connection to an electrical socket and an optical socket, wherein the electrical and optical connectors may be moved between an extended position and a retracted position relative to the electronics housing when being engaged or disengaged with respective electrical and optical sockets.

16. An optical transceiver for connection of an optical socket to an electrical socket, the optical transceiver comprising:
   an electronics housing having a first arm section and a parallel second arm section;
   an optical connector;
   an optical connector latching mechanism housed in the first arm section and attached to the optical connector, the optical latching mechanism moveable between an extended and retracted position;
   an electrical connector;
   an electrical connector latching component housed in the second arm section and attached to the electrical connector, the electrical latching component moveable between an extended and retracted position; and
   a handle connected to the optical connector latching component and the electrical connector latching component.

* * * * *